Patented Dec. 27, 1932

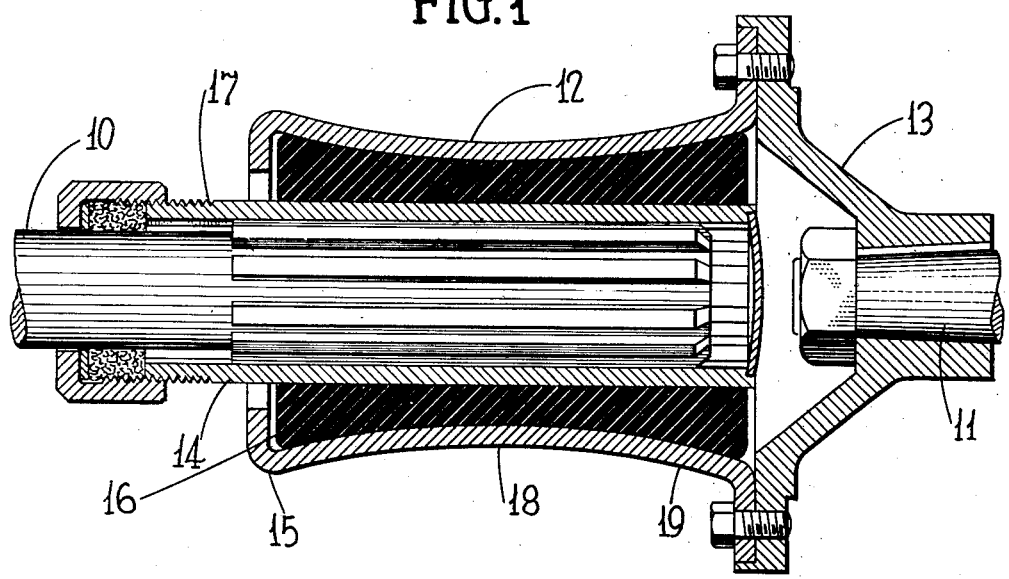
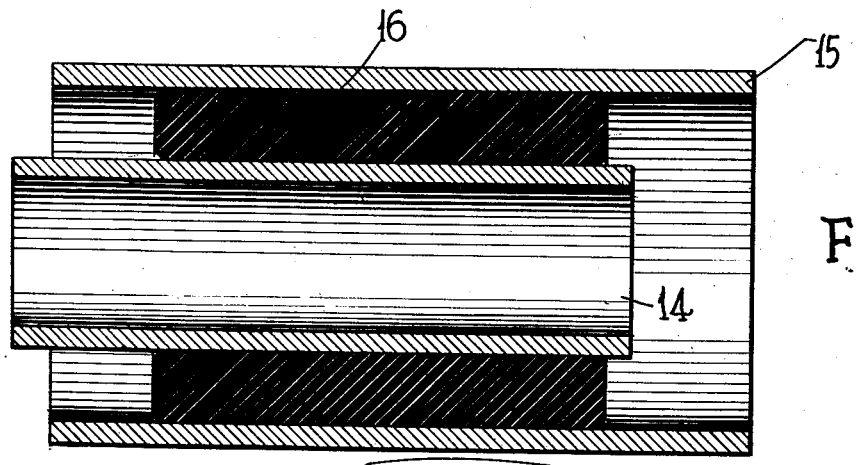
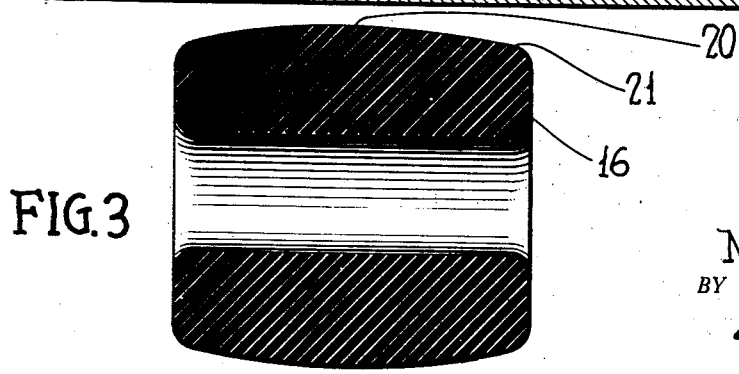

1,892,037

UNITED STATES PATENT OFFICE

MAURICE A. CREWS, OF PHILADELPHIA, PENNSYLVANIA, ASSIGNOR TO BUDD WHEEL COMPANY, OF PHILADELPHIA, PENNSYLVANIA, A CORPORATION OF PENNSYLVANIA

UNIVERSAL JOINT

Application filed February 4, 1931. Serial No. 513,265.

Rubber articulated joints have been proposed in which a rubber sleeve is telescoped between telescoping spaced inner and outer metallic members in a condition affording a drive between the metallic members through the rubber medium by reason of the adhesion of the surfaces of the metal members through the contacting rubber surfaces. Such a joint is disclosed in the application of Leon Thiry, Serial No. 293,374, filed July 17, 1928. The primary object of my invention has been to improve upon the construction of the joint of that application by providing an improved disposition of the stress in the rubber sleeve. It has been my object to effect such a distribution of the stress in this member as to effectively prevent the imposition of an extreme stress upon any portion of this sleeve upon axial disalignment of the driving and driven shafts.

An incidental object of my invention has been a mutual arrangement of the telescoped members affording a distribution of stress in the rubber sleeve tending to maintain it in its normal axial relationship to the telescoping metallic members with which it coacts. A further object of my invention pertains to an improved method of constructing a joint having the above mentioned structural advantages. A further object has been to produce a universal joint whose parts may be cheaply and simply fabricated of pressed metal.

Other objects and advantages of my invention will be obvious from a reading of the sub-joined specification in the light of the attached drawings, in which:

Fig. 1 is a central axial section through my improved joint.

Fig. 2 illustrates a step in the manufacture of my joint, and

Fig. 3 is a sectional view through the rubber sleeve which constitutes the articulating medium in my joint.

Referring to the drawing by reference characters, the numerals 10 and 11 designate the driving and driven shafts of my joint. Either of these shafts may, of course, be the driving and the other the driven shaft, but I shall designate 10 the driving shaft for purpose of convenience of description. The shaft 11 is driven from the shaft 10 through the medium of a universal joint 12 which is connected to the driven shaft by means of a collar 13 keyed to this shaft and attached to the outer member of the joint. The inner member of the joint is connected to the driving shaft 10 by means of a splined connection 17.

The universal joint proper comprises an inner metallic member 14 and an outer metallic member 15 interconnected by a rubber sleeve 16. This sleeve is held between the metallic joint members in a condition affording a frictional drive between the contacting surfaces of the sleeve and joint members respectively through the body of the sleeve.

As thus far described my joint is essentially similar to that described in the aforementioned Thiry application. In accordance with my invention I have, however, formed the outer member of the joint and the rubber sleeve of tapering longitudinal cross section affording an improved distribution of the stress in the rubber sleeve. I have formed the outer metallic member of differential diameter which is a minimum in its central portion 18 and a maximum adjacent the outer longitudinal extremities 19. As a consequence of this differential diameter a maximum stress is imposed upon the rubber sleeve in the portion adjacent its longitudinal center and the tension is somewhat relieved in the outer longitudinal regions of the sleeve. I have also formed the rubber sleeve of a maximum thickness adjacent its longitudinal center and a minimum thickness adjacent its longitudinal extremities. Both the outer metallic member and the sleeve preferably taper gradually between these maximum and minimum dimensions.

As a consequence of this differential formation of these members I obtain a universal joint in which the rubber member is tensioned to a high degree in its central longitudinal portion but is subjected to a much smaller degree of tension in the region of its longitudinal extremities. Hence, upon the axial disalignment of the shafts an extremely high tension upon the axial extremities of the sleeve is avoided. Relative universal movement of the shafts is thus greatly facilitated, a much smaller amount of energy being absorbed in the act of effecting an axial disalignment of the shafts than would be the case if the parts were of similar shapes. The distribution of stress in the rubber member also tends to keep this member in a central position with respect to the metallic members of the joint.

I prefer to form both the inner and outer members of my joint of sheet metal. Although these members may be formed and assembled in a number of ways, I prefer to assemble them before the outer metallic member 15 has been given its final dimensions. The rubber sleeve is thus first assembled between telescoping metallic sleeves 14 and 15 and the outer metallic sleeve is thereafter formed to its final curved dimensions by means of suitable spinning, swaging, stamping or other conventional metal working operations.

It has been found to be highly desirable in connection with joints of this type to effect a considerable elongation of the rubber sleeve in its assembled position. Attempts to obtain suitable elongation during the assembling operation have heretofore presented a very puzzling problem. By forming my joint as described above, I find it unnecessary to effect any very considerable elongation of the rubber member during the initial assembly of the parts. The swaging or other forming operation which is employed to distort the outer metallic member 15 effects a considerable elongation of the rubber sleeve and the initial deformation does not therefore need to be even comparable in degree to that employed in connection with universal joints of the prior art.

It will thus be seen that I have not only devised a joint providing improved conditions of stress distribution in the rubber sleeve, but that I have also formed a joint of inexpensive sheet metal members by a very simple and effective method.

Modifications will be obvious to those skilled in the art and I do not therefore wish to be limited except by the scope of my subjoined claims as interpreted in the light of the generic spirit of my invention.

What I claim is:

1. A universal joint comprising, in combination, annularly spaced telescoped inner and outer driving and driven members interconnected by a rubber sleeve telescoped therewith and occupying an annular space therebetween to effect a driving connection between said inner and outer members, the inner face of the outer member being of curved longitudinal cross section and having a minimum diameter in its central region and maximum diameter in the neighborhood of its axial extremities.

2. A universal joint comprising, in combination, annularly spaced telescoped inner and outer driving and driven members interconnected by a rubber sleeve telescoped therewith and occupying the annular space therebetween to effect a driving connection between said inner and outer members, the inner face of the outer member being of varying internal diameter, which is a minimum in the neighborhood of the axial central portion of the member and increases progressively toward its axial extremities.

3. A universal joint comprising, in combination, annularly spaced telescoped inner and outer driving and driven members interconnected by a rubber sleeve telescoped therewith and occupying an annular space therebetween to effect a driving connection between said inner and outer members, the inner face of the outer member being of curved longitudinal cross section and having a minimum diameter in its central region and maximum diameter in the neighborhood of its axial extremities, and the outer face of the inner member being substantially cylindrical.

In testimony whereof I hereunto affix my signature.

MAURICE A. CREWS.